Patented Apr. 19, 1932

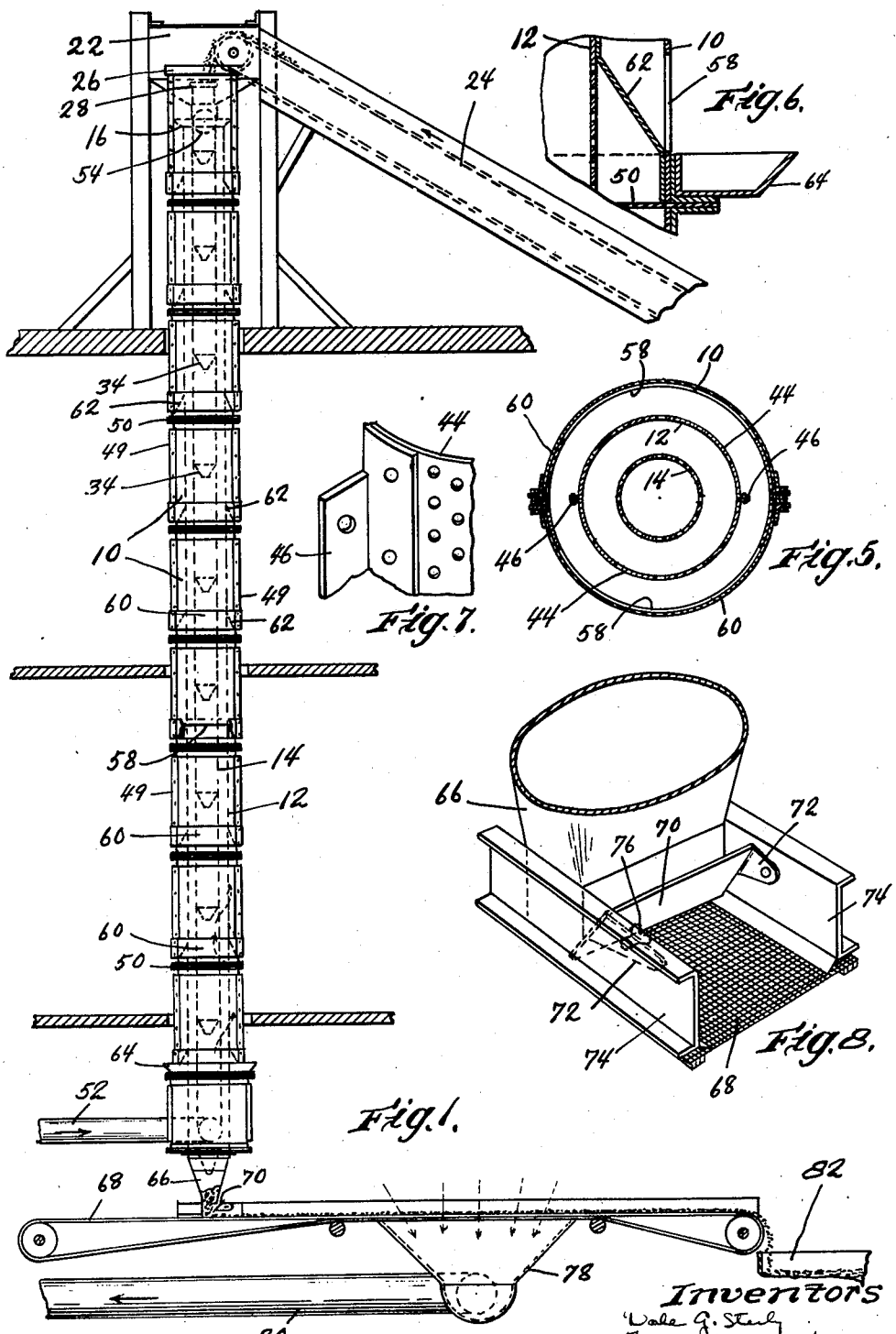

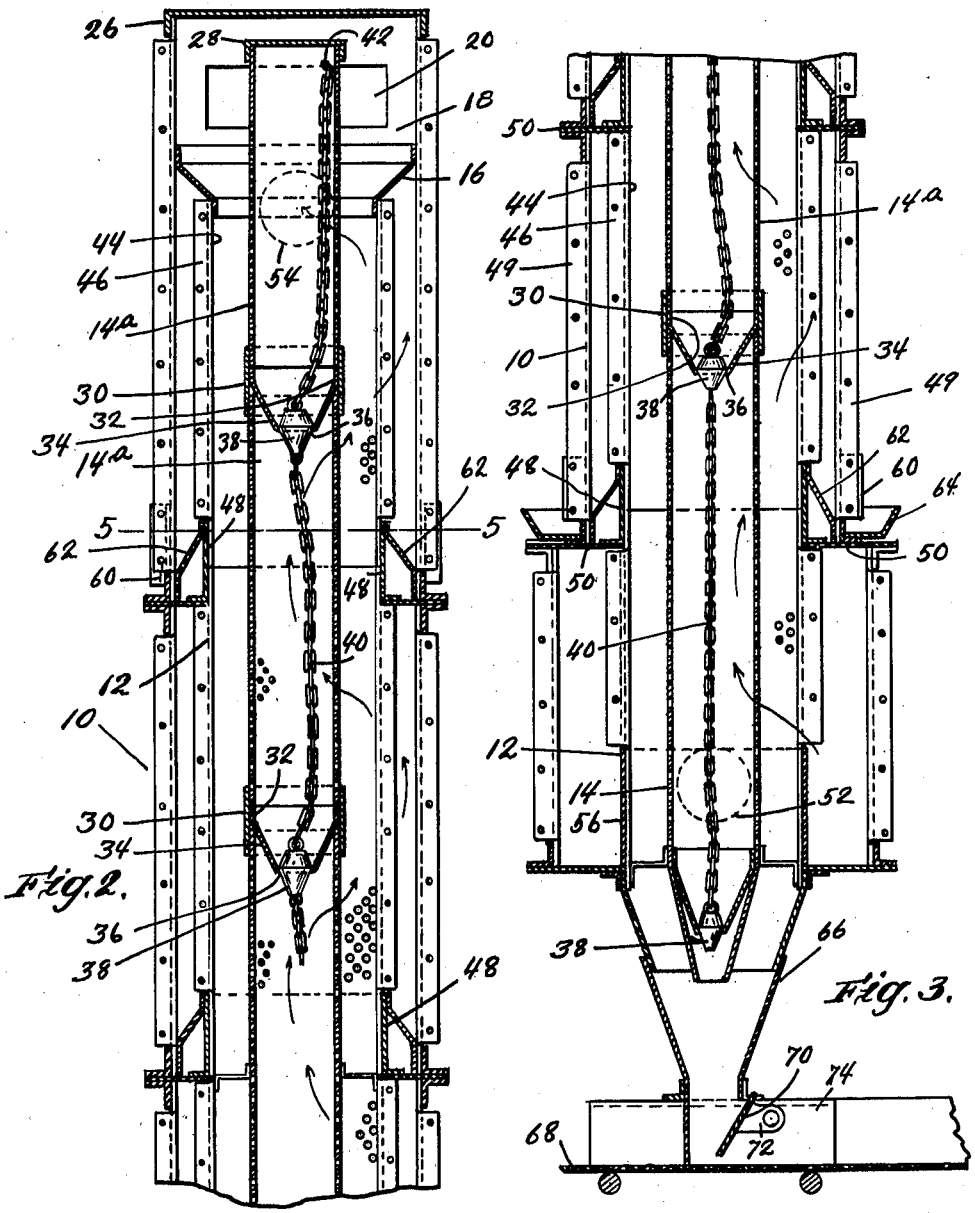

1,854,429

UNITED STATES PATENT OFFICE

DALE G. STEELY, OF ARLINGTON, AND FREDERICK W. BLAKE, OF MEDFORD, MASSA-CHUSETTS, ASSIGNORS, BY MESNE ASSIGNMENTS, TO SAID STEELY

APPARATUS FOR THE CONTINUOUS DRYING AND ROASTING OF COCOA BEANS AND THE LIKE

Application filed June 10, 1927. Serial No. 197,960.

This invention relates to drying and roasting apparatus especially adapted for the drying and roasting of cocoa beans and the like and has for an object the provision of a dryer and roaster through which a continuous stream of beans are adapted to pass and to dry and roast the beans in their passage.

A further object is generally to improve the construction and operation of drying and roasting apparatus.

Fig. 1 is a side elevation partly in section of the continuous dryer and roaster embodying this invention.

Fig. 2 is a sectional elevation of the upper portion of the roaster.

Fig. 3 is a sectional elevation of the lower portion of the roaster.

Fig. 4 is a perspective detail of the gate at the discharge nozzle of the roaster.

Fig. 5 is a sectional view taken along line 5—5 of Fig. 2, and illustrating the construction at a clean-out opening.

Fig. 6 is an enlarged sectional detail illustrating the construction of the lowermost dust pocket.

Fig. 7 is a perspective detail illustrating the construction at the end of one of the intermediate tube plates.

Fig. 8 is a perspective detail illustrating the arrangement of the discharge nozzle of the stack with relation to the conveyer belt.

A continuous dryer and roaster embodying this invention comprises a long vertical stack of susbtantial height having the outermost tube 10, the intermediate tube 12, and the innermost tube 14, which tubes are preferably cylindrical and are concentric and spaced a substantial distance apart.

The outermost tube is imperforate while the innermost and intermediate tubes are perforate.

The cocoa beans or other material to be dried and roasted are adapted to occupy the space or passage between the innermost tube 14 and intermediate tube 12 and to pass gradually downwardly in said space and ultimately to issue from the stack in roasted condition. The beans are adapted to be dried and roasted by means of heated gases which are caused to circulate alternately in opposite directions through the hollow column of beans from one end to the other of the column. The upper end of the intermediate tube is terminated below the top of the outermost tube and an imperforate conical plate 16 is disposed within and is fixed to the wall of the outermost tube and to the upper end of the intermediate tube, thereby to provide a funnel which is inclined downwardly toward the open end of the intermediate tube. The compartment 18 in the outermost tube above the end of the intermediate tube comprises a hopper adapted to contain a constant supply of raw beans to be dried and roasted. The beans are fed into the hopper through an opening 20 in the side wall of the outermost tube which opening communicates with a bin 22, see Fig. 1. Beans are delivered to the bin by a conveyor belt 24 or other means. The top of the stack is closed by a removable cover 26 which fits over the open end of the outermost tube. The innermost tube is terminated immediately under said cover and above the end of the intermediate tube and the open end of said innermost tube is closed by the removable cover 28.

The innermost tube 14 is composed of a plurality of tube sections 14a which are disposed in vertical alignment with their ends juxtaposed, with the ends of the tube sections secured rigidly together by means of encircling bands 30. A plurality of gas-stopping diaphragms are disposed in said innermost tube at spaced intervals therealong whereby to cause the heated gases to circulate between the innermost and outermost tubes and through the bean-passage. Said diaphragms are funnel-shaped and are formed with cylindrical walls 32 which are interposed between the proximate ends of the tube sections. Said cylindrical walls are integral with downwardly-inclinded conical walls 34 which are provided with apertures 36 in the bottom, and said apertures are normally closed by tampons 38. In the operation of the roaster, dust and chaff collect on the diaphragms and should be removed before it accumulates to too great an extent. This is accomplished by raising the tampons to uncover their respective apertures in the diaphragms. The tampons are connected by chains 40, the uppermost end of which has its upper end attached to a hook 42 immediately under the cover 38 of the innermost tube. When the chain is raised, the openings in all the diaphragms are uncovered so that the dust and chaff can fall from one tube section into another and ultimately out of the lower open end of the lowermost tube.

The intermediate tube also is composed of a plurality of sections and each section is formed of two semi-cylindrical perforated sheets 44 which have outstanding flanges 46 at the opposite edges thereof that are bolted removably together to form a complete cylindrical section. The sections are superimposed in vertical alignment and are secured together by cylindrical bands 48 which encircle the abutting ends of the adjacent sections.

The outermost tube 10 is similarly constructed with the exception that the semicylindrical sheets forming its side wall are imperforate and the sections are secured detachably together by bolts passed through opposed flanges 49 of the sections. Diaphragm plates 50 are interposed between the sections of the outermost tube and are in substantially gas-tight engagement with the intermediate tube whereby to isolate the sections from each other. Said diaphragm plates are disposed substantially mid-way between the diaphragms 34 in the innermost tube so that the hot stream is caused to pass from the outer portion of one section transversely through the intermediate tube into the bottom portion of a section of the innermost tube and thence outwardly through the upper portion of said section and through the intermediate tube into the lower portion of the next upper section of the outermost tube, as indicated by the arrows, Figs. 1 and 2. Heated gas as hot air from any suitable source is passed under suitable pressure through a pipe 52 into the bottom of the lowermost section of the outer tube and the cooled gas is discharged from the uppermost section of the outer tube through the discharge opening 54. A cylindrical plate 56 surrounds the lower portion of the perforated intermediate tube adjacent the hot gas inlet pipe 52 to prevent the heated gases from passing directly through said intermediate tube into the innermost tube and constrains the heated gas to flow diagonally upwardly through the column of beans in the intermediate tube and into the innermost tube. The plates 48 in the upper sections also constrain the gas to flow upwardly and outwardly from the innermost tube into the outermost tube, thus increasing the length of contact of the gas with the material to be dried and roasted. The side walls of the outermost tube sections are provided with opening 58, best shown in Fig. 5, at the bottom thereof for the purpose of removing dust that may collect in the sections. Said openings are normally closed by the flexible openings encircle the sections over the bands 60 which, the ends of which are secured removably together to hold the bands in the aforesaid relation. The sections are provided with downwardly and outwardly inclined angular walls 62 over the diaphragm plates 50 at said openings to facilitate the removal of the dust that collects thereupon. The next to the lowermost section is provided with an annular tray 64 which surrounds the outermost tube immediately beneath the clean out opening and is adapted to catch the dust when it is removed through said openings.

The lower end of the intermediate tube is extended below the lower end of the outer tube and is provided with a conical discharge nozzle 66, see Fig. 8, that has a long and relatively narrow opening therein through which the roasted beans are adapted to be discharged, the area of the opening, however, being approximately the same as the area of the space between the innermost and intermediate tubes. The beans are adapted to be discharged upon a horizontally disposed conveyor belt 68 which is disposed immediately below the nozzle 66 and is adapted to support the vertical column of beans within the intermediate tube. The front wall of the nozzle is provided with a gate 70, the elevation of which above the conveyor belt can be adjusted. Said gate is provided with forwardly directed ears 72 which are pivoted to side plates 74 disposed on opposite sides of the nozzle. A clamping screw 76 serves to hold the gate releasably in any adjusted position above the conveyor belt. The elevation of the gate above the conveyor determines the thickness of the layer of roasted beans on the belt and the speed of travel of the belt determines the rate at which beans are withdrawn from the roaster stack. By varying the rate of travel of the belt, the length of time during which the beans are subjected to the hot gas can be varied thereby to obtain any desired degree of drying and roasting. The hot roasted beans are cooled on the perforated conveyor belt by cool air which is drawn by a suitable suction device, not shown, from the room downwardly through the hot beans and the belt and into a hood 78 disposed immediately beneath the belt. The cooled beans are discharged from the belt into a suitable receptacle 82.

If the beans contain an appreciable moisture content when they are introduced into the hopper at the top of the roaster stack, the upper portion of the stack constitutes a dryer wherein the moisture is evaporated; and the lower portion of the stack constitutes the roaster. If the beans are substantially dry when they are introduced to the stack, the speed of the conveyor belt may be increased, since the beans do not need to remain in the stack for so long a time as when moisture is present, and the entire stack then constitutes the roaster.

The apparatus thus described is adapted to discharge a continuous stream of roasted beans from the end of the conveyor belt for so long as the conveyor belt is maintained in motion and the stack is supplied with raw beans and heated gases. A more uniform roast is obtained than is commercially practicable with the usual batch process since the apparatus does not require skilled supervision once the speed of the conveyor belt and temperature and pressure of the heated gas is adjusted for the required conditions. Danger of continuing the roasting after the beans have been discharged from the roaster, is obviated since the beans are automatically cooled on the conveyor belt before they are discharged therefrom.

It will be noted that in the roaster herein described the flow of heated gas is contrary to the flow of cocoa beans, so that the raw, moisture-containing bean comes in contact only with relatively cool gas, while the dry bean, alone, is subject to the hot gas. While the broad counter-flow idea of heat-exchange is old for improving the efficiency of heat-exchange, the principle herein utilized for the drying and roasting of cocoa beans produces unexpected and highly beneficial results, namely, that the flavor of the roasted bean is markedly improved and that a higher yield of shell-free beans or nibs is obtained. A main reason therefor appears to be as follows:

The bean, when raw, has a considerable moisture content which is of an acrid or acid nature and it is a function of the roasting process to drive off the moisture and the vaporizable acrid and acid substances for the purpose of improving the flavor of the bean. The raw bean usually is entirely covered with a film or coating which has a mucilaginous nature and is a product of the pulp of the bean pod. When the raw moist bean is subjected immediately to the roasting temperature, the mucilaginous film immediately dries and forms practically an imperforate closure for the bean so that all of the volatile acid and acrid substances cannot escape freely but are retained in the roasted bean, thereby impairing the flavor of the bean and to a material extent, defeating one of the objects of the roasting process. Furthermore, the shells are rendered tough and not readily breakable and adhere to the beans especially when "low roasting" so that a substantial amount of shell sticks to the nibs, thus resulting in inferior chocolate and cocoa.

With the apparatus embodying this invention, it is found that the flavor of the roasted bean is improved and that the shell is brittle and readily separates from the kernels in the cracking and winnowing machine, so that the nibs are more readily freed from shell. These results appear to be attained largely because the raw moist beans are first subjected to a large volume of partially cooled gas so that the mucilaginous coating on the moist beans does not solidify. The moisture expelled from the beans in a lower strata of the roaster is taken up by the gas and acts on the beans in the upper strata, thus keeping the shells of the beans in a condition wherein they are readily dried and are thus gas permeable. As a result, the acrid and acid vapors can escape freely from the interior of the beans. The shells, also, are brittle and thus can be separated easily from the beans and nibs without the necessity of high roasting although the roaster will roast to any required high degree.

With the process and apparatus herein disclosed the roasting can be done at a relatively low temperature and yet the shells will come off the beans readily whereas, with the usual process, the roasting must be carried out at a materially higher temperature or the beans must be roasted twice.

With this process and apparatus, the roast is practically free from broken beans since the beans are not agitated during the roast as in the usual process and apparatus.

We claim:

1. A continuous roaster for cocoa beans and the like comprising inner and outer spaced vertical tubes having perforated side walls, the space between said tubes constituting an unobstructed vertical passage for the beans which is open at the top and the bottom, the inner tube being closed at the bottom and the outer tube being open at the bottom and being extended below the bottom of said inner tube, means to move beans in a continuous manner along the length of said passage, including a horizontal continuously movable conveyor belt which is located immediately under the open bottom of said outer tube and which constitutes the support for the column of beans in said passage, and means including said tubes to pass a heated gas repeatedly between said tubes from one end progressively toward the other of said tubes and repeatedly in opposite directions generally transversely through said passage from one to the other end thereof.

2. A continuous drier and roaster for cocoa beans and the like comprising three approximately concentric spaced vertical tubes, each composed of vertically aligned connected sections, the similar ends of the sections of the two outer tubes being opposed and the ends of the innermost tube sections being staggered with respect to the ends of the sections of said outer tubes, said innermost and said intermediate tubes having perforated side walls and said outermost tube having an imperforate side wall, the space between said innermost and intermediate tubes comprising a passage for the material to be roasted, the bottom of the innermost tube being closed above the bottom of said passage, which passage is characterized by being open at the top for the entrance of raw material thereinto and open at the bottom for the discharge of the roasted material, a horizontal flat support disposed below the closed bottom of said innermost tube and at the bottom opening of said passage for the column of material therein, said support being continuously movable whereby to withdraw beans in a continuous manner from said passage and to cause the beans to move in a continuous manner along the length of said passage, and means to pass heated gas from one end to the other of said tubes and alternately between the innermost and outermost tubes and through the intermediate tube, said means including spaced diaphragms in said innermost tube at the connected ends of the sections and also in the space between the two outer tubes at the opposed ends of the sections so that the diaphragms in said outermost tube are staggered with respect to the diaphragms in said innermost tube.

3. A continuous drier and roaster for cocoa beans and the like comprising three approximately concentric spaced vertical tubes, said innermost and said intermediate tubes having perforated side walls and said outermost tube having an imperforate side wall, the space between said innermost and intermediate tubes comprising a passage for the material to be roasted which passage is characterized by being open at the top for the entrance of material thereinto and open at the bottom for the discharge of the roasted material, a movable conveyor belt disposed at the bottom opening of said passage and comprising a support for the column of material therein, said support being continuously movable whereby to withdraw beans in a continuous manner from said passage and to cause the beans to move in a continuous manner along the length of said passage, and means to pass heated gas from one end to the other of said tubes and alternately between the innermost and outermost tubes and through the intermediate tube, said means including spaced diaphragms in said innermost and outermost tubes, the diaphragms in said outermost tube being staggered with respect to the diaphragms in said innermost tube, the diaphragms in said innermost tube having passages therethrough, and removable closures for said passages.

4. A continuous drier and roaster for cocoa beans and the like comprising three approximately concentric spaced vertical tubes, said innermost and said intermediate tubes having perforated side walls and said outermost tube having an imperforate side wall, the space between said innermost and intermediate tubes comprising a passage for the material to be roasted, which passage is characterized by being open at the top for the entrance of material thereinto and open at the bottom for the discharge of the roasted material, and means to pass heated gas from one end to the other of said tubes and alternately between the innermost and outermost tubes and through the intermediate tube, said means including spaced diaphragms in said innermost and outermost tubes, the diaphragms in said outermost tube being staggered with respect to the diaphragms in said innermost tube, the diaphragms in said innermost tube having passages therethrough, removable closures in said passages, and means interconnecting said closures.

5. A continuous drier and roaster for cocoa beans and the like comprising an outermost vertical tube, an innermost vertical tube and an intermediate vertical tube, all spaced one from the other, said innermost and intermediate tubes having perforate side walls and said outer tube having an imperforate side wall, the space between said innermost and intermediate tubes constituting a passage for the material to be dried and roasted, said passage having an open top for the entrance of raw material and having an open bottom for the discharge of roasted material, a conveyor belt disposed beneath the open bottom of said passage in position to receive roasted material therefrom and to support the material in said passage, vertically-spaced diaphragms disposed in said innermost tube dividing it into a plurality of normally isolated sections, other vertically-spaced diaphragms located in said outermost tube to divide it into a plurality of isolated sections, the diaphragms of one tube being disposed intermediate the diaphragms of the other tube, means to admit a heated gas into the lowermost section of the outermost tube to pass upward through the material-passage and in and out of the isolated tube sections, and means to remove dust that may accumulate on said diaphragms.

6. A continuous drier and roaster for cocoa beans and the like comprising an outermost vertical tube, an innermost vertical tube and an intermediate vertical tube, all spaced one from the other, said innermost and intermediate tubes having perforate side walls and said outer tube having an imperforate side wall, the space between said innermost and intermediate tubes constituting a passage for the material to be dried and roasted, said passage having an open top for the entrance of raw material and having an open bottom for the discharge of roasted material, vertically-spaced diaphragms disposed in said innermost tube dividing it into a plurality of normally isolated sections, other vertically spaced diaphragms located in said outermost tube to divide it into a plurality of isolated sections, the diaphragms of one tube being disposed intermediate the diaphragms of the other tube, means to admit a heated gas into the lowermost section of the outermost tube to pass upwardly transversely of the material passage and in and out of the isolated tube sections, said innermost and outermost tubes having provision for the removal of dust that may accumulate on the diaphragms thereof.

7. A continuous drier and roaster for cocoa beans and the like comprising an outermost vertical tube, an innermost vertical tube and an intermediate vertical tube, all spaced one from the other, said innermost and intermediate tubes having perforate side walls and said outer tube having an imperforate side wall, the space between said innermost and intermediate tubes constituting a passage for the material to be dried and roasted, said passage having an open top for the entrance of raw material and having an open bottom for the discharge of roasted material, a conveyor belt disposed beneath the open bottom of said passage in position to receive roasted material therefrom and to support the material in said passage, vertically-spaced diaphragms disposed in said innermost tube dividing it into a plurality of normally isolated sections, other vertically-spaced diaphragms located in said outermost tube to divide it into a plurality of isolated sections, the diaphragms of one tube being disposed intermediate the diaphragms of the other tube, means to admit a heated gas into the lowermost section of the outermost tube to pass upward transversely of the material passage and in and out of the isolated tube sections, said outermost tube having clean-out openings located at the diaphragms thereof, and said innermost tube having provision for the removal of material that may collect on said diaphragms.

8. A continuous drier and roaster for cocoa beans and the like comprising an outermost vertical tube, an innermost vertical tube and an intermediate vertical tube, all spaced one from the other, said innermost and intermediate tubes having perforate side walls and said outer tube having an imperforate side wall, the space between said innermost and intermediate tubes constituting a passage for the material to be dried and roasted, said passage having an open top for the entrance of raw material and having an open bottom for the discharge of roasted material, vertically-spaced diaphragms disposed in said innermost tube dividing it into a plurality of normally isolated sections, other vertically-spaced diaphragms located in said outermost tube dividing it into a plurality of isolated sections, the diaphragms of one tube being disposed intermediate the diaphragms of the other tube, means to admit a heated gas into the lowermost section of the outermost tube to pass upwardly transversely of the material passage and in and out of the isolated tube sections, said outermost tube having normally closed clean-out openings in the side wall thereof at the diaphragms, the diaphragms of said innermost tube having openings therein, closures normally covering said openings, and operating means interconnecting all of said closures.

9. A drier and roaster for cocoa beans and the like including concentric cylindrical vertical perforated tubes which provide between them a tubular passage down which the beans progress, said outer tube being extended downwardly below the bottom of said inner tube and said inner tube having a closed bottom, a movable support for the column of beans in said passage located below the bottom of said inner tube, and means including a removable closure for the bottom of said inner tube providing for the removal of combustible dust that may collect within said inner tube.

10. A continuous drier and roaster for cocoa beans and the like comprising three approximately concentric-spaced vertical tubes, said innermost and said intermediate tubes having perforated side walls and said outermost tube having an imperforate side wall, the space between said innermost and intermediate tubes comprising a passage for the material to be roasted, which passage is characterized by being open at the top for the entrance of raw beans thereinto and open at the bottom for the discharge of the roasted beans, the bottom of the innermost tube being closed above the bottom of said passage, a horizontal flat conveyor belt for the column of material in said passage disposed immediately below the bottom opening thereof, said belt being continuously movable whereby to withdraw beans in a continuous manner from said passage and to cause the beans to move in a continuous manner along the length of said passage, a gate which is located above said belt at the bottom and at one side of said passage and which has means supporting it for vertical movement above said belt, whereby to govern the thickness of the layer of beans on said belt and thereby to govern the rate of withdrawal of beans from said passage, and means including said tubes to pass a heated gas alternately and repeatedly between the innermost and outermost tubes and through the bean passage between said innermost and said intermediate tube and from one end to the other of said tubes.

In testimony whereof, we have signed our names to this specification.

DALE G. STEELY.
FREDERICK W. BLAKE.